B. J. WILLIAMS.

Blind-Slat Operators.

No. 5,528. Reissued August 5, 1873.

Witnesses:

David W. De Forest

W. Burris

Inventor:

Benj J. Williams

By Attorney G. R. Fowler

UNITED STATES PATENT OFFICE.

BENJAMIN J. WILLIAMS, OF PHILADELPHIA, PENNSYLVANIA.

IMPROVEMENT IN BLIND-SLAT OPERATORS.

Specification forming part of Letters Patent No. 102,900, dated May 10, 1870; reissue No. 5,528, dated August 5, 1873; application filed July 5, 1873.

DIVISION B.

*To all whom it may concern:*

Be it known that I, BENJ. J. WILLIAMS, of Philadelphia, in the county of Philadelphia and State of Pennsylvania, have invented certain new and useful Improvements in Blind-Slat Operators; and I do hereby declare that the following is a full, clear, and exact description thereof that will enable others skilled in the art to which it appertains to make and use the same, reference being had to the accompanying drawings and to the letters of reference marked thereon, which form a part of this specification.

Figure 1:
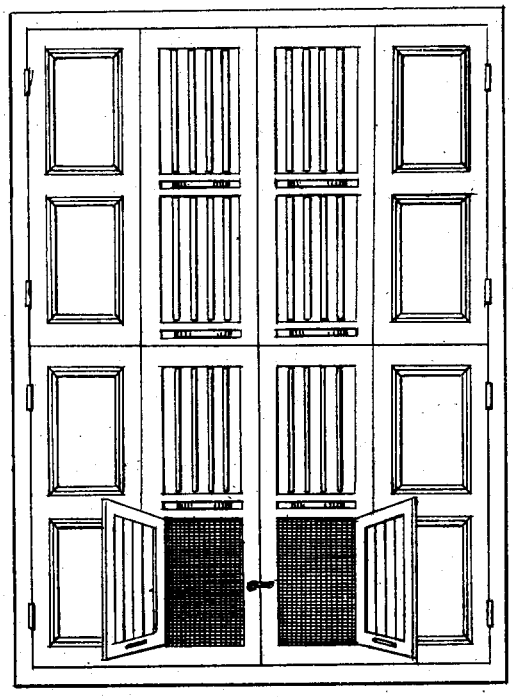
Figure 2:
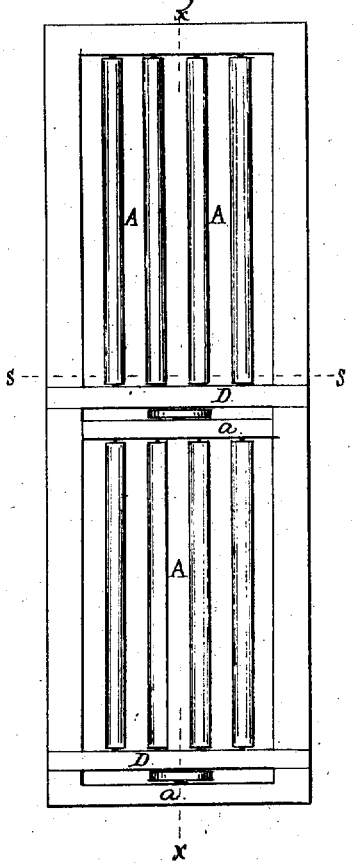
Figure 3:
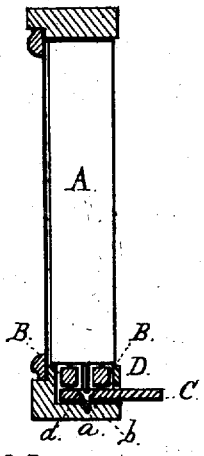
Figure 4:
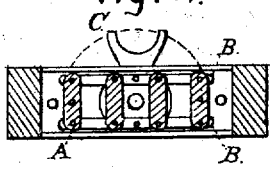

Figure 1 is a front or inside view of blind and folding shutter. Fig. 2 is a front view of a section of the blind detached. Fig. 3 is a vertical section, as indicated by the dotted line *x x* of Fig. 2. Fig. 4 is a cross-section, as indicated by the dotted line *s s* of Fig. 2.

Like letters in all figures of the drawings indicate like parts.

This invention relates to blinds or slat-doors; and consists in having movable slats, preferably arranged lengthwise upon movable parallel slides, operated by a center lever pivoted to the rail, the two outer slats being secured to the rail by pivotal guide-rods. A plate is let in across the stiles to inclose the said operating devices, a slot or opening being left between this plate and the rail for the lever to work in when operating the slats; and the rail is provided with a narrow slot or holes to keep the dust from settling on the same and interfering with the slides and lever working freely, all arranged in novel combination with each other, as will be hereinafter more fully explained.

A A are the movable slats, having their bottom-corner ends pivoted to the movable parallel slides B B. C is the lever attached centrally to the rail *a* by the pivot-screw *b*. Upon this lever the movable slides are pivoted. That portion of the lever resting upon the rail is made round, so that its back end will not come in contact with the back part of the rail when turning it. D is the plate let in across the stiles, so as to inclose the operating devices, the plate being placed enough above the rail to leave an opening or slot, *c*, for the lever to work in, which is operated to close or open the slats to admit air and light into the room by pushing it to the right or left. The bottom ends of the two outer slats are secured to the rail by the pivotal guide-rods *d*, which extend up from the rail into the center of each thereof, so as to cause the slides to close the slats properly together. Holes are made in the rail to let the dust out that would otherwise accumulate therein and interfere with the free working of the slides.

Having thus fully described my invention, what I claim therein as new, and desire to secure by Letters Patent, is—

In combination with the movable slats of a blind or slat-door, the center lever C, movable parallel slides B B, and pivotal guide-rods *d*, all arranged upon the rail and inclosed by plate D, the slot *c* being left between the plate and rail for the lever to work in, substantially as set forth.

In testimony that I claim the foregoing I have hereunto set my hand.

BENJN. J. WILLIAMS.

Witnesses:

B. J. WILLIAMS, Jr.,

JOHN THARP.